(12) United States Patent
Nguyen

(10) Patent No.: US 11,648,758 B2
(45) Date of Patent: May 16, 2023

(54) FORMED ARTICLE

(71) Applicant: SUMITOMO ELECTRIC FINE POLYMER, INC., Osaka (JP)

(72) Inventor: Hong-Phuc Nguyen, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 0 days.

(21) Appl. No.: 17/775,660

(22) PCT Filed: Nov. 18, 2020

(86) PCT No.: PCT/JP2020/042930
§ 371 (c)(1),
(2) Date: May 10, 2022

(87) PCT Pub. No.: WO2021/106701
PCT Pub. Date: Jun. 3, 2021

(65) Prior Publication Data
US 2022/0388287 A1    Dec. 8, 2022

(30) Foreign Application Priority Data

Nov. 27, 2019  (JP) .............................. JP2019-214474

(51) Int. Cl.
*B32B 27/08* (2006.01)
*B32B 1/08* (2006.01)
(Continued)

(52) U.S. Cl.
CPC ................ *B32B 27/08* (2013.01); *B32B 1/08* (2013.01); *B32B 25/08* (2013.01); *B32B 27/20* (2013.01);
(Continued)

(58) Field of Classification Search
CPC ................ B32B 1/08; B32B 2262/101; B32B 2262/106; B32B 2264/1022; B32B 2264/108; B32B 2307/538; B32B 2307/732; B32B 25/08; B32B 2597/00; B32B 27/08; B32B 27/20; B32B 27/281; B32B 27/288; G03G 15/00; G03G 15/20;
(Continued)

(56) References Cited

U.S. PATENT DOCUMENTS

2014/0226927 A1*  8/2014  Ishii ........................ F16C 13/02
384/291

FOREIGN PATENT DOCUMENTS

EP       3666691       *  6/2020
JP       2001-056615 A    2/2001
(Continued)

OTHER PUBLICATIONS

International Search Report for corresponding Application No. PCT/JP2020/042930, dated Feb. 9, 2021.

*Primary Examiner* — Yan Lan
(74) *Attorney, Agent, or Firm* — Renner, Otto, Boisselle & Sklar, LLP

(57) ABSTRACT

A formed article according to one embodiment of the present disclosure includes a cylindrical base layer containing a polyimide as a main component, a sliding layer disposed on an inner circumferential surface side of the base layer and containing a polyether ether ketone as a main component, and an outermost layer disposed on an outer circumferential surface side of the base layer and containing a fluororesin as a main component.

18 Claims, 1 Drawing Sheet

(51) Int. Cl.
  *B32B 27/20* (2006.01)
  *B32B 27/28* (2006.01)
  *B32B 25/08* (2006.01)
  *G03G 15/20* (2006.01)

(52) U.S. Cl.
  CPC .......... *B32B 27/281* (2013.01); *B32B 27/288* (2013.01); *G03G 15/2053* (2013.01); *B32B 2262/101* (2013.01); *B32B 2262/106* (2013.01); *B32B 2264/108* (2013.01); *B32B 2264/1022* (2020.08); *B32B 2307/538* (2013.01); *B32B 2307/732* (2013.01); *B32B 2597/00* (2013.01); *G03G 2215/2048* (2013.01)

(58) Field of Classification Search
  CPC ........ G03G 15/2053; G03G 2215/2048; F16C 13/02; F16C 2208/32; F16C 2208/36; F16C 2208/40; F16C 33/121; F16C 33/124
  See application file for complete search history.

(56) References Cited

FOREIGN PATENT DOCUMENTS

| | | |
|---|---|---|
| JP | 2017-132832 A | 8/2017 |
| JP | 2017-207642 A | 11/2017 |
| JP | 2018-146835 A | 9/2018 |
| WO | 2013-042715 A1 | 3/2013 |

\* cited by examiner

FORMED ARTICLE

TECHNICAL FIELD

The present disclosure relates to a formed article. The present application claims priority based on Japanese Patent Application No. 2019-214474 filed on Nov. 27, 2019, and the entire contents of the Japanese patent application are incorporated herein by reference.

BACKGROUND ART

In image-forming apparatuses such as copy machines and laser beam printers, a heat fixing method has been generally employed in the final stage of printing and copying. This heat fixing method is a method for forming an image in which a transfer-receiving material, such as a printing sheet, onto which a toner image has been transferred is passed between a fixing roller provided with a heating source on the inner circumferential surface thereof and a pressure roller to thereby melt unfixed toner by heating and to fix the toner to the transfer-receiving material.

As the fixing roller, for example, a fixing roller having a structure that includes a tubular core formed of a polyimide is used in view of formability. This polyimide tubular article is worn by sliding contact with a nip plate disposed on the inner circumferential side thereof, and wear debris are likely to be generated. Furthermore, the wear debris of the polyimide aggregate together to form a large mass, which may accelerate wear. In addition, the use of such a polyimide tubular article may increase a torque due to a high initial friction coefficient. To address these problems, there is disclosed a film tubular article for a fixing device, the film tubular article using a polyimide to which a lubricant is added (refer to Japanese Unexamined Patent Application Publication No. 2001-56615).

CITATION LIST

Patent Literature

PTL 1: Japanese Unexamined Patent Application Publication No. 2001-56615

SUMMARY OF INVENTION

A formed article according to one embodiment of the present disclosure includes a cylindrical base layer containing a polyimide as a main component, a sliding layer disposed on an inner circumferential surface side of the base layer and containing a polyether ether ketone as a main component, and an outermost layer disposed on an outer circumferential surface side of the base layer and containing a fluororesin as a main component.

DESCRIPTION OF EMBODIMENTS

Figure 1:
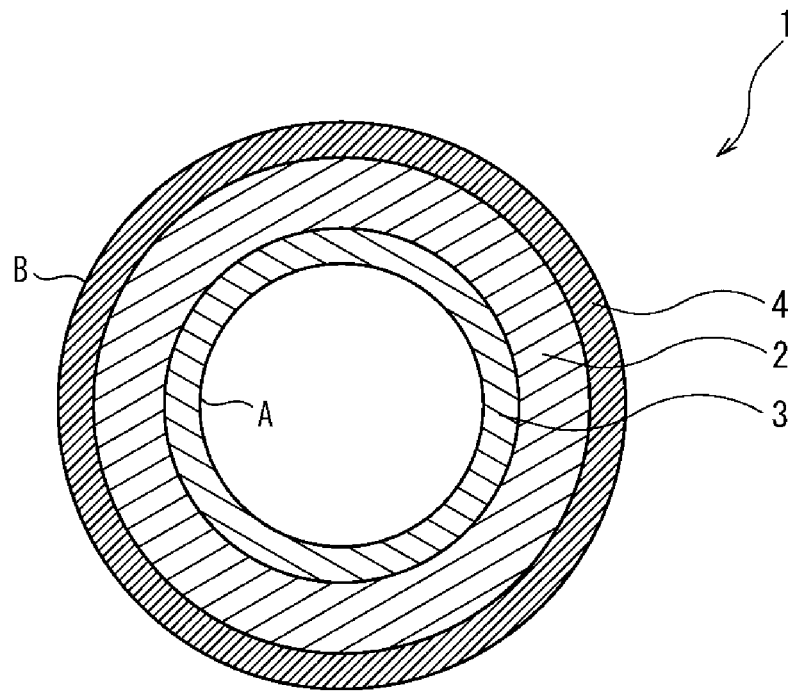
FIG. 1 is a schematic cross-sectional view illustrating a formed article according to a first embodiment.

Problems to be Solved by Present Disclosure

In recent years, the speed-up of printing and further improvement of durability have been desired in the field of office automation (OA), and in a fixing roller formed of a tubular article using a polyimide to which a lubricant is added as described in the above publication, there is a room for improvement in wear resistance on the inner circumferential surface and the reduction and decrease in the friction coefficient.

The present disclosure has been made in view of the circumstances described above, and an object of the present disclosure is to provide a formed article having high wear resistance and good sliding properties even in the case of using a base layer containing a polyimide as a main component.

Advantageous Effects of Present Disclosure

A formed article according to one embodiment of the present disclosure has high wear resistance and good sliding properties even in the case of using a base layer containing a polyimide as a main component.

DESCRIPTION OF EMBODIMENTS OF PRESENT DISCLOSURE

Embodiments according to the present disclosure will be first listed and described.

A formed article according to one embodiment of the present disclosure includes a cylindrical base layer containing a polyimide as a main component, a sliding layer disposed on an inner circumferential surface side of the base layer and containing a polyether ether ketone as a main component, and an outermost layer disposed on an outer circumferential surface side of the base layer and containing a fluororesin as a main component.

Since the formed article includes the sliding layer that is disposed on the inner circumferential surface side of the base layer containing a polyimide as a main component and that contains a polyether ether ketone as a main component, the formed article has a reduced friction coefficient and has a good effect of suppressing an increase in the torque while maintaining the characteristics of the polyimide base, which has good formability.

Furthermore, since the outermost layer containing a fluororesin as a main component is provided, releasability can be improved. Thus, the formed article according to one embodiment of the present disclosure has high wear resistance and good sliding properties and can have improved durability while a polyimide, which has good processability, is used as the base layer.

The sliding layer preferably has an average thickness of 5 μm to 100 μm. When the average thickness of the sliding layer is within this range, wear resistance of the formed article can be further improved. The term "average thickness" as used herein refers to the average of thicknesses measured at 10 random points.

The formed article preferably further includes an elastic layer disposed on the outer circumferential surface side of the base layer and on an inner circumferential surface side of the outermost layer and containing rubber as a main component. The outermost layer tends to have relatively low elasticity because the outermost layer contains a fluororesin as a main component. However, in the formed article, when the elastic layer containing rubber as a main component is disposed on the outer circumferential surface side of the base layer and on the inner circumferential surface side of the outermost layer containing a fluororesin as a main component, elasticity of the outermost layer is improved.

The term "main component" as used herein refers to a component having the highest content and indicates, for example, a component having a content of 50% by volume or more.

In the formed article, the content of the polyimide in the base layer is preferably 70% by volume to 100% by volume. According to this embodiment, flexibility and heat resistance of the formed article are improved.

In the formed article, the content of the polyimide in the base layer is preferably 99.5% by volume to 100% by volume. According to this embodiment, flexibility and heat resistance of the formed article are further improved.

In the formed article, the content of the polyether ether ketone in the sliding layer is preferably 51% by volume to 100% by volume. According to this embodiment, wear resistance of the sliding layer is improved.

In the formed article, the content of the polyether ether ketone in the sliding layer is preferably 70% by volume to 100% by volume. According to this embodiment, wear resistance of the sliding layer is further improved.

In the formed article, the content of the fluororesin in the outermost layer is preferably 50% by volume or more. According to this embodiment, wear resistance of the outermost layer is improved.

In the formed article, the content of the rubber in the elastic layer is preferably 70% by mass to 100% by mass. When such an elastic layer is disposed on the inner circumferential surface side of the outermost layer, elasticity of the outermost layer is improved.

In the formed article, the content of the rubber in the elastic layer is preferably 99% by mass to 100% by mass. When such an elastic layer is disposed on the inner circumferential surface side of the outermost layer, elasticity of the outermost layer is further improved.

In the formed article, the sliding layer preferably has an average thickness of 10 µm to 50 µm. According to this embodiment, film formability of the sliding layer is improved.

In the formed article, an inner circumferential surface of the sliding layer preferably has an arithmetical mean roughness Ra of 1.4 µm to 3.3 µm. According to this embodiment, slidability of the inner circumferential surface of the sliding layer is improved.

In the formed article, an inner circumferential surface of the sliding layer preferably has a ten-point mean roughness Rz of 6.8 µm to 11.7 µm. According to this embodiment, slidability of the inner circumferential surface of the sliding layer is improved.

In the formed article, the base layer preferably contains a filler, and the filler is preferably at least one selected from a titanate compound, titanium oxide, a carbon nanotube, natural graphite, a carbon fiber, a glass fiber, and wollastonite. According to this embodiment, wear resistance of the formed article can be further improved.

In the formed article, the elastic layer preferably contains vulcanized rubber. According to this embodiment, elasticity of the elastic layer can be further improved; consequently, elasticity of the formed article is further improved.

In the formed article, the sliding layer constitutes an inner circumferential surface of the formed article. According to this embodiment, since the sliding layer containing a polyether ether ketone as a main component is provided on the inner circumferential surface, good sliding properties are provided. In the formed article, the outermost layer constitutes an outer circumferential surface of the formed article. According to this embodiment, since the outermost layer containing a fluororesin as a main component is provided on the outer circumferential surface, good releasability is provided.

[Details of Embodiments of Present Disclosure]

Hereafter, formed articles according to embodiments of the present disclosure will be described in detail with reference to the drawings.

First Embodiment

<Formed Article>

A formed article according to a first embodiment includes a cylindrical base layer, a sliding layer disposed on an inner circumferential surface side of the base layer, and an outermost layer disposed on an outer circumferential surface side of the base layer and containing a fluororesin as a main component. FIG. 1 is a schematic sectional view illustrating a formed article 1 according to the first embodiment. The formed article 1 includes a cylindrical base layer 2, a sliding layer 3 disposed on an inner circumferential surface of the base layer 2, and an outermost layer 4 disposed on an outer circumferential surface of the base layer 2 and containing a fluororesin as a main component. The sliding layer 3 constitutes an inner circumferential surface A of the formed article 1, and the outermost layer 4 constitutes an outer circumferential surface B of the formed article 1. Since the formed article 1 has a cylindrical shape, the formed article 1 can be suitably used in various rotary members (rollers) such as a fixing roller in a fixing unit, a heating roller, a developing roller in a developing unit, a charging roller, a transfer roller, a roller for supporting an endless belt in another part, a paper discharge roller, a dust removing roller, and a transport roller for image-forming apparatuses such as copy machines, printers, and facsimiles.

The lower limit of the average thickness of the formed article 1 is not particularly limited but is preferably, for example, 30 µm, and the upper limit of the average thickness is preferably, for example, 150 µm.

[Base Layer]

The base layer 2 has a cylindrical shape and can be suitably used in various rotary members (rollers) for image-forming apparatuses.

The base layer 2 contains a polyimide as a main component. The polyimide is relatively light in weight and has good heat resistance and flexibility. Since the base layer 2 contains the polyimide as a main component, the formability is satisfactory. Polyimides are resins having imide bonds in their molecules. Polyimides can be obtained by, for example, subjecting a tetracarboxylic acid or an anhydride thereof serving as an acid component and a diamine compound serving as an amine component to a polycondensation reaction in a reaction solvent and subjecting the resulting polyimide precursor to dehydration cyclization by heating or the like.

Examples of the tetracarboxylic acid and the anhydride thereof include aromatic tetracarboxylic dianhydrides such as pyromellitic dianhydride, 3,3',4,4'-benzophenonetetracarboxylic dianhydride, benzene-1,2,3,4-tetracarboxylic dianhydride, naphthalene-2,3,6,7-tetracarboxylic dianhydride, 3,3',4,4'-diphenyl tetracarboxylic dianhydride, 2,2",3,3"-p-terphenyltetracarboxylic dianhydride, 2,2-bis(2,3-dicarboxyphenyl)-propane dianhydride, bis(2,3-dicarboxyphenyl)ether dianhydride, bis(2,3-dicarboxyphenyl)methane dianhydride, 3,3',4,4'-diphenylsulfonetetracarboxylic dianhydride, bis(2,3-dicarboxyphenyl)sulfone dianhydride, 1,1-bis(2,3-dicarboxyphenyl)ethane dianhydride, perylene-3,4,9,10-tetracarboxylic dianhydride, and phenanthrene-1,2,7,8- tetracarboxylic dianhydride; alicyclic acid anhydrides such as cyclopentane-1,2,3,4-tetracarboxylic dianhydride; and heterocyclic derivatives such as pyrazine-2,3,5,6-tetracarboxylic dianhydride. The foregoing tetracarboxylic acids and anhydrides thereof may be used alone or in combination of two or more thereof.

Examples of the diamine compound include aromatic diamines such as 2,2-di(p-aminophenyl)-6,6'-bisbenzoxazole, p-phenylenediamine, m-phenylenediamine, 4,4'-diaminodiphenylpropane, 2,2-bis[4-(4-aminophenoxy)phenyl]propane, 4,4'-diaminodiphenyl sulfone, 4,4'-diaminodiphenyl ether, benzidine, 4,4'-diamino-p-terphenyl, p-bis(2-methyl-4-aminopentyl)benzene, 1,5-diaminonaphthalene, 2,4-diaminotoluene, m-xylene-2,5-diamine, and m-xylylenediamine; and aliphatic diamines such as piperazine, methylenediamine, ethylenediamine, and tetramethylenediamine. The foregoing diamine compounds may be used alone or in combination of two or more thereof.

The lower limit of the content of the polyimide in the base layer 2 is preferably 50% by volume, more preferably 70% by volume, still more preferably 80% by volume, even still more preferably 90% by volume, and particularly preferably 99.5% by volume. The content may be 100% by volume. That is, the base layer 2 may be a polyimide layer that is composed only of a polyimide and that does not contain, for example, a binder. If the content is less than the lower limit, the formed article 1 may have insufficient flexibility and heat resistance.

The base layer 2 may contain a filler. When the base layer 2 contains a filler, electrical conductivity of the formed article can be improved.

The filler used may be publicly known fillers. Examples thereof include titanate compounds such as potassium titanate and aluminum titanate, titanium oxide, carbon nanotubes, natural graphite, carbon fibers, glass fibers, and wollastonite. The foregoing fillers may be used in combination of two or more thereof.

The shape of the filler is preferably an acicular or scaly shape from the viewpoint that wear resistance of the formed article can be further improved. The term "acicular shape" as used herein means a shape having an aspect ratio (ratio of the length to the diameter of the filler) of 1.5 or more, and preferably 2 or more. The sectional shape of the filler perpendicular to the length direction is not limited to a circle. If the sectional shape of the filler is not a circle, the maximum length of the section is defined as the diameter to determine the aspect ratio. The term "scaly shape" also includes a flaky shape and a plate shape.

The average thickness of the base layer 2 is not particularly limited as long as sufficient strength can be maintained, and is preferably, for example, 5 μm to 300 μm.

[Sliding Layer]

The sliding layer 3 is disposed on the inner circumferential surface of the base layer 2. The sliding layer 3 contains a polyether ether ketone as a main component. Since the sliding layer 3 contains a polyether ether ketone as a main component, the formed article 1 has high wear resistance and good sliding properties.

The lower limit of the average thickness of the sliding layer 3 is preferably 5 μm, and more preferably 10 μm. On the other hand, the upper limit of the average thickness is preferably 100 μm, more preferably 50 μm, and still more preferably 30 μm. If the average thickness is less than 5 μm, film formability of the sliding layer 3 may deteriorate. Contrarily, if the average thickness exceeds 100 μm, thermal conductivity of the formed article 1 may decrease. The term "average thickness" refers to a value determined by measuring a thickness of the sliding layer in a section perpendicular to the length direction of the sliding layer 3 at 10 random points with an optical microscope, and averaging the thicknesses.

The lower limit of the content of the polyether ether ketone in the sliding layer 3 is preferably 50% by volume, more preferably 51% by volume, and still more preferably 70% by volume. The content of the polyether ether ketone in the sliding layer 3 may be 100% by volume. If the content of the polyether ether ketone in the sliding layer 3 is less than the lower limit, the wear resistance of the sliding layer 3 may decrease, and the formed article 1 may have insufficient wear resistance.

The sliding layer 3 preferably further contains, besides the polyether ether ketone, polytetrafluoroethylene (PTFE), a tetrafluoroethylene-perfluoroalkoxyethylene copolymer (PFA), a tetrafluoroethylene-hexafluoropropylene copolymer (FEP), a tetrafluoroethylene-ethylene copolymer (ETFE), or a combination of these, and more preferably further contains, of these, polytetrafluoroethylene. When the sliding layer 3 contains a polyether ether ketone as a main component and further contains the foregoing resin component, wear resistance and heat resistance can be further improved.

(Outermost Layer)

The outermost layer 4 contains a fluororesin as a main component. Since the outermost layer 4 contains a fluororesin as a main component, the outermost layer 4 has good wear resistance. In the outermost layer 4, the content of the fluororesin is preferably 50% by volume or more. The outermost layer 4 may contain other optional components as long as the effects of the present disclosure are not impaired.

Examples of the fluororesin include polytetrafluoroethylene (PTFE), tetrafluoroethylene-perfluoroalkoxyethylene copolymers (PFA), tetrafluoroethylene-hexafluoropropylene copolymers (FEP), polyvinylidene fluoride (PVDF), tetrafluoroethylene-ethylene copolymers (ETFE), polychlorotrifluoroethylene (PCTFE), chlorotrifluoroethylene-ethylene copolymers (ECTFE), polyvinyl fluoride (PVF), fluoroolefin-vinyl ether copolymers, vinylidene fluoride-tetrafluoroethylene copolymers, and vinylidene fluoride-hexafluoropropylene copolymers. Of these, the fluororesin is preferably PTFE, PFA, and FEP, more preferably PFA and PTFE, and still more preferably PTFE in view of wear resistance, chemical resistance, and heat resistance. The foregoing fluororesins may be used alone or in combination of two or more thereof.

The fluororesin may include structural units derived from other copolymerizable monomers as long as the effects of the present disclosure are not impaired. For example, PTFE may include structural units of, for example, perfluoro (alkylvinyl ether), hexafluoropropylene, (perfluoroalkyl) ethylene, and chlorotrifluoroethylene. The upper limit of the content of the structural units derived from the other copolymerizable monomers is, for example, 3% by mole relative to the total structural units constituting the fluororesin.

The lower limit of the average thickness of the outermost layer 4 is preferably 5 μm, and more preferably 20 μm. On the other hand, the upper limit of the average thickness is preferably 50 μm, and more preferably 40 μm. If the average thickness is less than 5 μm, durability of the formed article 1 may decrease. Contrarily, if the average thickness exceeds 50 μm, elasticity of the formed article 1 may decrease.

[Method for Producing Formed Article]

A method for producing the formed article preferably includes, for example, a step of forming a sliding layer containing a polyether ether ketone as a main component on an inner circumferential surface side of a cylindrical base layer containing a polyimide as a main component, and a step of forming an outermost layer containing a fluororesin as a main component on an outer circumferential surface side of the base layer. The method for producing the formed article, the method including the above steps, enables the production of a formed article having high wear resistance and good sliding properties.

(Step of Forming Sliding Layer)

In this step, a sliding layer is formed on the inner circumferential surface side of a cylindrical base layer containing a polyimide as a main component. A sliding layer resin composition containing a polyether ether ketone as a main component is first prepared. Next, coating, extrusion molding, injection molding, or the like is performed by using the sliding layer resin composition, and baking is then performed to form a sliding layer. The coating means is not particularly limited, and various methods such as methods with a spray coater, an electrostatic coating device, a flow coater, a dip coater, or the like can be employed. The baking temperature may be, for example, 100° C. to 500° C.

(Step of Forming Outermost Layer)

In this step, an outermost layer containing a fluororesin as a main component is formed on an outer circumferential surface side of the base layer after the step of forming the sliding layer. Examples of the method for forming the outermost layer include a coating of an outermost layer resin composition containing a fluororesin as a main component and covering with a PFA heat shrinkable tube. In the case where the outer circumferential surface of the base layer is coated with the outermost layer resin composition, a coating material in which the outermost layer resin composition is dispersed or dissolved in a solvent is applied to the outer circumferential surface of the base layer. The solvent that can be used is a liquid mixture in which the fluororesin can be efficiently dispersed, such as a liquid mixture of water and an emulsifier, water and an alcohol, water and acetone, or water, an alcohol, and acetone. Next, the base layer coated with the coating material is placed in a heating furnace and heated to evaporate the solvent in the coating material and to bake the fluororesin. The baking temperature of the fluororesin may be, for example, 300° C. to 400° C. Subsequently, the outer circumferential surface of the base layer is cooled to form the outermost layer on the outer circumferential surface of the base layer.

The formed article according to the first embodiment has high wear resistance and good sliding properties.

Second Embodiment

<Formed Article>

A formed article according to a second embodiment further includes an elastic layer disposed on an outer circumferential surface side of the base layer and on an inner circumferential surface side of the outermost layer and containing rubber as a main component.

Figure 2:
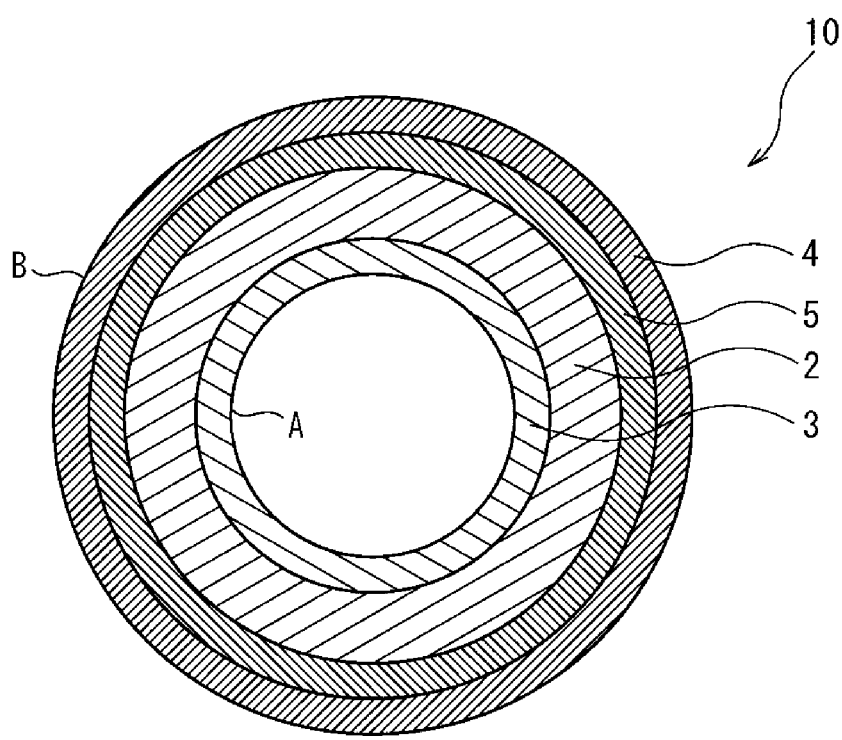
FIG. 2 is a schematic cross-sectional view illustrating a formed article according to a second embodiment.

FIG. 2 is a schematic cross-sectional view illustrating a formed article 10 according to the second embodiment. The formed article 10 in FIG. 2 includes a cylindrical base layer 2, a sliding layer 3 disposed on an inner circumferential surface of the base layer 2, an elastic layer 5 disposed on an outer circumferential surface of the base layer 2, and an outermost layer 4 disposed on an outer circumferential surface of the elastic layer 5. Note that the base layer 2, the sliding layer 3, and the outermost layer 4 are the same as those of the first embodiment and thus are assigned the same reference numerals, and a description thereof is omitted.

(Elastic Layer)

The elastic layer 5 is disposed on the outer circumferential surface of the base layer 2. The elastic layer 5 contains rubber as a main component.

Therefore, the elastic layer 5 has sufficient elasticity. Although the outermost layer 4 containing a fluororesin as a main component tends to have relatively low elasticity, in the formed article 10, the elasticity of the outermost layer 4 can be improved because the elastic layer containing rubber as a main component is disposed on the inner circumferential surface of the outermost layer containing a fluororesin as a main component. In addition, since the elastic layer 5 is disposed on the inner circumferential surface of the outermost layer 4, the interlayer adhesive force between the elastic layer 5 and the outermost layer 4 can be further improved. The rubber is preferably vulcanized. The vulcanization of the rubber enables the elasticity of the elastic layer 5 to be further improved, resulting in a further improvement in the elasticity of the formed article 10.

Examples of the rubber that can be used include, but are not particularly limited to, natural rubber, synthetic natural rubber, butadiene rubber, styrene-butadiene rubber, butyl rubber, nitrile rubber, ethylene-propylene rubber, chloroprene rubber, acrylic rubber, chlorosulfonated polyethylene rubber, urethane rubber, silicone rubber, fluororubber, ethylene-vinyl acetate rubber, epichlorohydrin rubber, and polysulfide rubber. The foregoing rubber may be used alone or in combination of two or more types thereof.

The lower limit of the content of the rubber in the elastic layer 5 is preferably 70% by mass, more preferably 90% by mass, and still more preferably 99% by mass. The content of the rubber in the elastic layer 5 may be 100% by mass. If the content of the rubber in the elastic layer 5 is less than the lower limit, the elasticity of the elastic layer 5 decreases, and the formed article 10 may have insufficient elasticity.

The elastic layer 5 may contain additives as components other than the rubber. Examples of the additives include plasticizers, stabilizers, lubricants, antioxidants, ultraviolet absorbers, flame retardants, colorants, and fillers. When the elastic layer 5 contains the additives in this manner, desired characteristics can be imparted to the elastic layer 5. The upper limit of the content of the additives in the elastic layer 5 is not particularly limited but is preferably, for example, 30% by mass.

The average thickness of the elastic layer 5 is not particularly limited and can be appropriately changed according to the application, and can be, for example, 0.1 mm to 50 mm.

<Method for Producing Formed Article According to Second Embodiment>

A method for producing the formed article according to the second embodiment may be, for example, a method further including a step of forming an elastic layer on the outer circumferential surface of the base layer after the step of forming a sliding layer in the above-described method for producing the formed article according to the first embodiment. In the step of forming an elastic layer, an elastic layer resin composition containing rubber as a main component is first prepared. Next, coating, extrusion molding, injection molding, or the like is performed by using the elastic layer resin composition on the outer circumferential surface of the base layer after the step of forming a sliding layer, and solidification is then performed to form an elastic layer. The vulcanization of the rubber of the elastic layer can be performed at any point in time during the production of the formed article.

The formed article according to the second embodiment has high wear resistance and good sliding properties and can have improved elasticity of the outermost layer. Since the formed article according to the second embodiment has a cylindrical shape as in the formed article according to the first embodiment, the formed article according to the second embodiment can be suitably used in various rotary members (rollers) such as fixing roller in a fixing unit, a heating roller, a developing roller in a developing unit, a charging roller, a transfer roller, a roller for supporting an endless belt in another part, a paper discharge roller, a dust removing roller, and a transport roller for image-forming apparatuses such as copy machines, printers, and facsimiles.

Other Embodiments

It is to be understood that the embodiments disclosed herein are only illustrative and non-restrictive in all respects. The scope of the present disclosure is not limited to the configurations of the embodiments but is defined by the appended claims, and is intended to cover all modifications within the meaning and scope equivalent to those of the claims.

The formed article may include another layer, for example, between the sliding layer and the base layer, between the outermost layer and the base layer, or between the outermost layer and the elastic layer. The other layer may be, for example, a primer layer or the like.

The inner circumferential surface of the outermost layer may be subjected to surface treatment to improve the adhesiveness thereof. Examples of the surface treatment include surface roughening by plasma treatment, liquid ammonia treatment, corona treatment, Tetra-Etch treatment, laser etching treatment, or the like.

The outermost layer 4 may be irradiated with ionizing radiation to crosslink the fluororesin, thereby improving wear resistance of the outermost layer 4.

Examples

Hereafter, the present disclosure will be described more specifically by way of Examples. However, the present disclosure is not limited to the following Examples.

<Film Nos. 1 to 9>

Film Nos. 1 to 3 each including a base layer and two-layer film Nos. 4 to 9 each including a base layer and a sliding layer were prepared by the following procedure using a base layer resin composition and a sliding layer resin composition for forming a base layer and a sliding layer, respectively, of a formed article. Table 1 shows the compositions (vol %) of the base layer resin composition and sliding layer resin composition constituting film nos. 1 to 9 and the average thickness of the sliding layer. Note that "-" in Table 1 indicates that the corresponding component was not used.

(Base Layer Resin Composition)

The base layer resin composition contains a filler as a component other than the main component contained therein. Acicular titanium oxide, scaly graphite, and carbon nanotubes were used as the filler.

(Sliding Layer Resin Composition)

A polyether ether ketone was used as the material of the sliding layer resin composition.

(Preparation of Film)

The base layer resin compositions having the compositions described in Table 1 were each applied in the form of a film. Next, baking was performed by heating to 420° C. to prepare Film Nos. 1 to 3. On the surfaces of the coating layers formed, in the form of a film, by applying the base layer resin compositions having the compositions described in Table 1, the sliding layer resin composition composed of the polyether ether ketone was formed by coating. Next, baking was performed by heating to 400° C. to prepare Film Nos. 4 to 9. The average thickness of the base layer was 70 μm. The average thickness of the sliding layer is shown in Table 1.

[Evaluation]

Next, for film Nos. 1 to 9, wear properties, friction properties, and surface roughness were evaluated.

(Rotational Friction and Wear Evaluation by Pin-On-Disk Friction and Wear Test)

A pin-on-disk friction and wear test refers to a test in which, for example, while a leading end of a metal pin serving as an indenter is pressed in a direction perpendicular to a sliding surface of a member to be tested, the sliding surface is rotated to thereby slide the metal pin in a revolving manner. The pin-on-disk friction and wear test was performed using "EFM-3-EN" manufactured by A&D Company, Limited as a friction and wear tester. Specifically, each of the surfaces of film Nos. 1 to 9 was subjected to a pin-on-disk friction and wear test in which, under heating at 180° C., two stainless steel pins having a diameter of 17.4 mm and disposed on a single circumference centered on the rotational axis were slid at a pressing load of 0.14 MPa and a rotational speed of 210 rpm for 2,000 seconds, and a wear depth [μm] of the worn region was measured. The leading end of each of the pins had a flat shape. The wear depth was defined by calculating a difference between an average thickness determined by measurement at eight points before the friction and wear test and an average thickness determined by measurement at eight points after the friction and wear test. In addition, a maximum friction coefficient at the initial stage (hereinafter referred to as an initial maximum friction coefficient) and a friction coefficient at the time when the friction coefficient became stable (which is defined as a friction coefficient in the steady state) were measured, and an amount of increase in initial friction [%] below was determined.

Amount of increase in initial friction[%]=(initial maximum friction coefficient−friction coefficient in steady state)×100/friction coefficient in steady state (Friction Test)
(1) Static Friction Coefficient The static friction coefficient was measured with "AUTOGRAPH" manufactured by Shimadzu Corporation at room temperature in accordance with ASTM-D (1894).

(2) Kinetic Friction Coefficient

The kinetic friction coefficient was measured with "FPR-2100" manufactured by RHESCA Co., LTD. at a load of 500 g using a stainless steel pin with a diameter of 3/16 inches serving as an indenter in an environment at 200° C. in a reciprocating mode.

(3) Amount of Increase in Static Friction

An amount of increase in static friction [%] below was calculated from the obtained values of the static friction coefficient and the kinetic friction coefficient.

Amount of increase in static friction[%]=(static friction coefficient−kinetic friction coefficient)×100/kinetic friction coefficient (Surface Roughness)

The arithmetical mean roughness (Ra) and the ten-point mean roughness (Rz) were determined with a surface roughness measuring instrument "SURFCOM 408A" manufactured by TOKYO SEIMITSU CO., LTD. in accordance with JIS-B-0601 (1994). Ra and Rz were measured at three points, and the averages were calculated.

Table 1 shows the evaluation results of the friction and wear test, the friction test, and the surface roughness in the films of Nos. 1 to 9.

TABLE 1

| | | Test No. | No. 1 | No. 2 | No. 3 | No. 4 | No. 5 | No. 6 | No. 7 | No. 8 | No. 9 |
|---|---|---|---|---|---|---|---|---|---|---|---|
| Base layer | Resin component [vol %] | Polyimide | 100 | 80 | 70 | 100 | 100 | 100 | 100 | 80 | 70 |
| | Filler [vol %] | Acicular titanium oxide and scaly graphite | — | 20 | — | — | — | — | — | 20 | — |
| | | Carbon nanotube | — | — | 30 | — | — | — | — | — | 30 |
| Sliding layer | Resin component [vol %] | Polyether ether ketone | — | — | — | 100 | 100 | 100 | 100 | 100 | 100 |
| | | Average thickness [μm] | — | — | — | 7 | 15 | 20 | 50 | 15 | 15 |
| Evaluation | Friction and wear test | Wear depth [μm] | 0.8 | 0.8 | 0.9 | 0.6 | 0.6 | 0.6 | 0.6 | 0.6 | 0.6 |
| | | initial maximum friction coefficient | 0.27 | 0.24 | 0.17 | 0.07 | 0.07 | 0.07 | 0.07 | 0.07 | 0.07 |
| | | Friction coefficient in steady state | 0.13 | 0.10 | 0.12 | 0.08 | 0.08 | 008 | 0.08 | 0.08 | 0.08 |
| | | Amount of increase in initial friction [%] (Initial maximum friction coefficient − Friction coefficient in steady state) × 100/Friction coefficient in steady state | 108 | 140 | 31 | −13 | −13 | −13 | −13 | −13 | −13 |
| | Friction test | Static friction coefficient | 0.17 | 0.17 | 0.18 | 0.10 | 0.09 | 0.09 | 0.09 | 0.09 | 0.09 |
| | | Kinetic friction coefficient | 0.12 | 0.12 | 0.13 | 0.08 | 0.08 | 0.08 | 0.08 | 0.08 | 0.08 |
| | | Amount of increase in static friction [%] (Static friction coefficient − Kinetic friction coefficient) × 100/Kinetic friction coefficient | 42 | 42 | 38 | 25 | 13 | 13 | 13 | 13 | 13 |
| | Surface roughness | Ra [μm] | 0.2 | 0.6 | 0.4 | 2.7 | 2.7 | 2.6 | 1.4 | 2.8 | 3.3 |
| | | Rz [μm] | 1.3 | 2.2 | 2.1 | 0.5 | 10.3 | 11.7 | 6.8 | 10.8 | 11.7 |

As shown in Table 1, film Nos. 4 to 9 each including the sliding layer composed of the polyether ether ketone show a small amount of wear and a small amount of increase in initial friction in the pin-on-disk wear test, demonstrating that the sliding layer is less likely to deform during sliding. On the other hand, film Nos. 1 to 3 each of which does not include the sliding layer composed of the polyether ether ketone and is composed only of the base layer containing the polyimide as the main component show a large amount of wear, a large amount of increase in initial friction, and a large amount of increase in static friction, and thus the necessary torque is considered to be large. In addition, film Nos. 4 to 9 each including the sliding layer composed of the polyether ether ketone have surface roughness significantly larger than that of film Nos. 1 to 3 each composed only of the base layer. This probably shows that since film Nos. 4 to 9 each including the sliding layer composed of the polyether ether ketone had very large surface roughness, the contact surface with the wear indenters was decreased, resulting in the improvement in slidability.

The above results demonstrated that the formed article had high wear resistance and good sliding properties.

REFERENCE SIGNS LIST 1, 10 formed article
2 base layer
3 sliding layer
4 outermost layer
5 elastic layer
A inner circumferential surface of formed article
B outer circumferential surface of formed article

The invention claimed is:

1. A formed article comprising:
   a cylindrical base layer containing a polyimide as a main component;
   a sliding layer disposed on an inner circumferential surface side of the base layer and containing a polyether ether ketone as a main component; and
   an outermost layer disposed on an outer circumferential surface side of the base layer and containing a fluororesin as a main component.

2. The formed article according to claim 1, wherein the sliding layer has an average thickness of 5 μm to 100 μm.

3. The formed article according to claim 1 or 2, further comprising an elastic layer disposed on the outer circumferential surface side of the base layer and on an inner circumferential surface side of the outermost layer and containing rubber as a main component.

4. The formed article according to claim 1, wherein a content of the polyimide in the base layer is 70% by volume to 100% by volume.

5. The formed article according to claim 1, wherein a content of the polyimide in the base layer is 99.5% by volume to 100% by volume.

6. The formed article according to claim 1, wherein a content of the polyether ether ketone in the sliding layer is 51% by volume to 100% by volume.

7. The formed article according to claim 1, wherein a content of the polyether ether ketone in the sliding layer is 70% by volume to 100% by volume.

8. The formed article according to claim 1, wherein a content of the fluororesin in the outermost layer is 50% by volume or more.

9. The formed article according to claim 3, wherein a content of the rubber in the elastic layer is 70% by mass to 100% by mass.

10. The formed article according to claim 3, wherein a content of the rubber in the elastic layer is 99% by mass to 100% by mass.

11. The formed article according to claim 1, wherein the sliding layer has an average thickness of 10 μm to 50 μm.

12. The formed article according to claim 1, wherein an inner circumferential surface of the sliding layer has an arithmetical mean roughness Ra of 1.4 μm to 3.3 μm.

13. The formed article according to claim 1, wherein an inner circumferential surface of the sliding layer has a ten-point mean roughness Rz of 6.8 μm to 11.7 μm.

14. The formed article according to claim 1, wherein the base layer contains a filler, and
   the filler is at least one selected from a titanate compound, titanium oxide, a carbon nanotube, natural graphite, a carbon fiber, a glass fiber, and wollastonite.

15. The formed article according to claim 3, wherein the elastic layer contains vulcanized rubber.

16. The formed article according to claim 1, wherein the sliding layer constitutes an inner circumferential surface of the formed article.

17. The formed article according to claim 1, wherein the outermost layer constitutes an outer circumferential surface of the formed article.

18. The formed article according to claim 1, wherein the sliding layer constitutes an inner circumferential surface of the formed article, and the outermost layer constitutes an outer circumferential surface of the formed article.

\* \* \* \* \*